Aug. 26, 1969  R. S. CHURCH  3,463,576
ANTI-GLARE REAR VIEW MIRROR FOR VEHICLES
Filed July 12, 1965
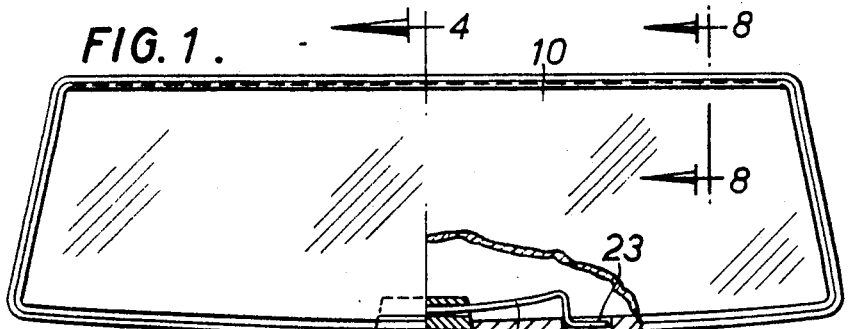
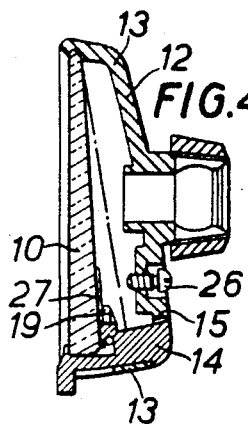
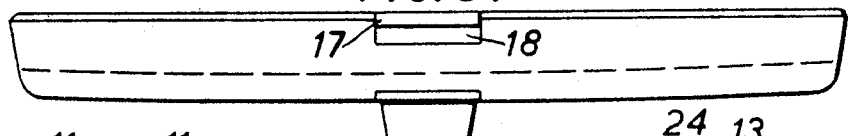
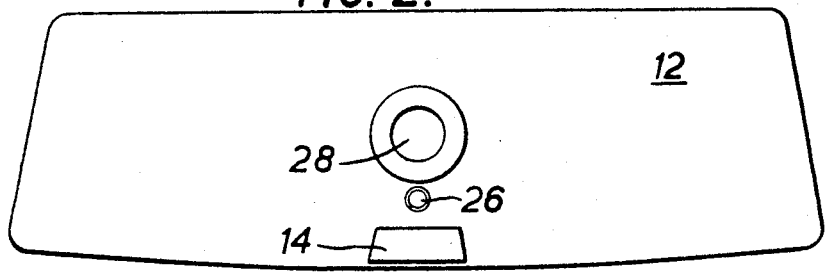

3,463,576
ANTI-GLARE REAR VIEW MIRROR FOR VEHICLES

Robert Stanley Church, Langley, Itchenor, England, assignor to Wingard Limited, Chichester, England, a British company
Filed July 12, 1965, Ser. No. 471,081
Claims priority, application Great Britain, July 10, 1964, 28,477/64
Int. Cl. G02b *17/00*
U.S. Cl. 350—281           1 Claim

ABSTRACT OF THE DISCLOSURE

An anti-glare rear-view mirror of the type having a mirror element with two surfaces of different reflecting power mounted in a case for movement about an upper edge of the mirror, improved trigger means for effecting movement of the mirror, the trigger means slidably engaging a flange extending forwardly from the lower edge of the case, the rear edges of the flange serving as stop means for the mirror.

---

This invention relates to improvements in rear view mirrors for vehicles of the kind in which a mirror element movably mounted in a case or housing incorporates two surfaces of different reflecting power arranged at a small angle to each other. Normally the reflecting surface of higher power is operative but if the driver is dazzled by the reflection in the mirror of the lights of a vehicle behind he can move the mirror element into a position in which the surface of lower reflective power becomes operative.

According to my invention, in a rear view mirror of that kind the mirror element is mounted in the case to rock about one edge, and a portion of the opposite edge is received in a trigger which is slidably mounted for movement backwards and forwards in the case and is provided with a stop or stops locating the mirror element in each of its two operative positions.

In a convenient arrangement the mirror element, which is of wedge shape in vertical section, is mounted in the case with its narrower edge uppermost, that edge being received in a groove or channel in the underside of a forwardly projecting flange on the upper end of the case and the element rocking about its upper edge as its lower edge is moved backwards and forwards by the trigger of which both ends are accessible for engagement by the fingers.

The trigger is preferably loaded by a spring which holds the mirror element resiliently in each of its operative positions.

This arrangement provides an extremely simple and economical construction incorporating a minimum number of parts.

One form of rear view mirror embodying our invention is illustrated by way of example in the accompanying drawings in which:

FIGURE 1 is a front elevation of the mirror with the glass partially broken away to show the spring;
FIGURE 2 is a rear elevation;
FIGURE 3 is an inverted plan;
FIGURE 4 is a vertical section on the line 4—4 of FIGURE 1, showing the mirror element in an operative position;
FIGURE 5 is a section similar to FIGURE 4 but showing the mirror element in the other operative position;
FIGURE 6 is an end view of the trigger by itself;
FIGURE 7 is a fragmentary section on a larger scale of the upper edge of the mirror element; and FIGURE 8 is a fragmentary section on a larger scale of the upper flange of the casing on the line 8—8 of FIGURE 1.

In the mirror illustrated the mirror element 10 is a glass member of substantially elongated rectangular outline and narrow wedge shape in vertical section. The element is silvered on its rear face which forms a surface of high reflective power while the front face of the glass forms a surface of low reflective power which is inclined at a small angle to the silvered surface. The element 10 is mounted in the mirror casing with its narrow edge uppermost and this edge is chamfered off on both sides as shown more particularly at 11 in FIGURE 7.

The case or housing 12 is formed as a plastic moulding or as a metal die-casting or pressing. The case comprises a substantially flat back with a forwardly projecting peripheral flange 13 which is of greater depth along the bottom of the case than along the top. A trigger 14 of the form shown more particularly in end view in FIGURE 6 is moulded from plastic or formed as a die-casting. The trigger is mounted in the centre of the lower part of the case for movement backwards and forwards in a direction substantially at right angles to the front of the case. The trigger is adapted to slide on the bottom flange 13 and its rear end projects through a slot 15 in the back of the case immediately above the bottom flange. Adjacent to its rear end there is a downwardly projecting lug or shoulder 16 adapted to engage with the bottom end of the slot to form a stop limiting the forward movement of the trigger. A stop limiting the rearward movement of the trigger is formed by a lug 17 projecting downwardly from the trigger at its forward end and working in a notch 18 of limited length in the bottom flange 13.

The trigger is loaded by a wire spring 19 comprising a substantially straight central part with downwardly and outwardly cranked ends 21. The central part is engaged in an undercut groove 22 in the trigger and the ends are engaged in recesses 23 formed in the upper surface of the bottom flange of the case. The disposition of the spring is such that it resiliently retains the trigger in each of its two limiting positions.

The glass mirror element 10 is mounted in the case with its chamfered narrower edge which is uppermost engaged in a longitudinal groove or channel 24 of wide V cross-section formed in the underside of the upper part of the case. The central portion of the lower edge of the mirror element is engaged in a recess 25 in the upper surface of the trigger adjacent to the front of the trigger.

The front and rear ends of the trigger are both accessible for engagement by the fingers and the mirror element is moved from either of its operative positions into the other position by simply pressing the trigger backwards or forwards, the mirror element pivoting about its upper edge in the groove or channel 24.

A comparison of FIGURES 4 and 5 will show that in one position of the mirror element the front surface of the glass which is of low reflective power occupies the plane occupied by the silvered rear surface of the glass in the other position and will give the driver the same field of view.

For fine image alignment of the inclination of the mirror element when it is in the limiting position shown in FIGURE 5 an adjusting screw 26 may be screwed through the back of the case, the inner end of the screw bearing on a protecting pad or strip 27 secured to the back of the mirror element.

The case is adapted to be adjustably mounted on a supporting arm by any convenient means such as a socket 28 on the back of the case adapted to receive a ball head on the arm on to which it is tightened by a nut 29.

Various minor modifications may be made in the mirror without departing from the scope of the invention.

For example the trigger may be formed with a lug extending upwardly behind the mirror element for co-operation with the adjusting screw 26. On its underside the trigger, instead of carrying spaced stop lugs 16 and 17, may be formed with a single downwardly projecting lug or finger working in a slot of limited length in the bottom flange of the case.

The wedge-shaped glass element may be replaced by a wedge of transparent plastic which is coated on its rear surface with a reflecting metal layer or is backed by a silvered sheet of glass or by a layer of metallised plastic sheet.

I claim:
1. A rear-view mirror for vehicles comprising a case, a mirror element incorporating two surfaces of different reflecting powers arranged at a small angle to each other located in said case, the upper edge of the mirror element having a rocking engagement with the case, and manually operable means for moving the mirror element angularly about its upper edge to bring either reflecting surface selectively into an operative position, wherein said case comprises a back having a peripheral forwardly extending flange, said manually operable means comprises a trigger having an operative engagement with the lower edge of the mirror element, a slot is formed in the back of the case, and the trigger projects through said slot and is in sliding engagement with the flange on the lower edge of the case for movement in a direction substantially at right angles to the back, the trigger having on its lower side stop lugs co-operating with parts of said flange to locate the mirror element in each of its two operative positions.

References Cited

UNITED STATES PATENTS

| | | |
|---|---|---|
| 2,469,207 | 5/1949 | Roedding _____ 350—281 |
| 2,502,699 | 4/1950 | Budreck _____ 350—280 |
| 2,669,159 | 2/1954 | Rogers _____ 350—281 |
| 2,910,915 | 11/1959 | Harris _____ 350—280 |

FOREIGN PATENTS 438,261   1935   Great Britain.

JOHN K. CORBIN, Primary Examiner